(12) United States Patent
Burchardt et al.

(10) Patent No.: US 12,331,714 B2
(45) Date of Patent: Jun. 17, 2025

(54) FLUID CONVEY TUBING SYSTEM FOR WIND TURBINE ROTOR BLADE

(71) Applicant: Siemens Gamesa Renewable Energy A/S, Brande (DK)

(72) Inventors: Claus Burchardt, Gistrup (DK); Mogens Nielsen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 145 days.

(21) Appl. No.: 17/602,011

(22) PCT Filed: Mar. 26, 2020

(86) PCT No.: PCT/EP2020/058499
§ 371 (c)(1),
(2) Date: Oct. 7, 2021

(87) PCT Pub. No.: WO2020/216574
PCT Pub. Date: Oct. 29, 2020

(65) Prior Publication Data
US 2022/0154686 A1 May 19, 2022

(30) Foreign Application Priority Data
Apr. 25, 2019 (EP) .................... 19171089

(51) Int. Cl.
*F03D 1/06* (2006.01)
*B29C 70/74* (2006.01)
(Continued)

(52) U.S. Cl.
CPC .......... *F03D 1/0675* (2013.01); *B29C 70/742* (2013.01); *B29K 2105/24* (2013.01);
(Continued)

(58) Field of Classification Search
CPC .... F03D 1/0675; F03D 7/0232; F03D 1/0633; F03D 7/022; F03D 1/0641; F03D 7/0296;
(Continued)

(56) References Cited

U.S. PATENT DOCUMENTS

| 5,106,265 A | 4/1992 | Holzem | |
| 8,794,919 B2 * | 8/2014 | Baek | F03D 1/0675 416/1 |
| 8,851,840 B2 * | 10/2014 | Hancock | F03D 1/0675 416/23 |
| 9,403,335 B2 * | 8/2016 | Madsen | B29C 70/342 |

(Continued)

FOREIGN PATENT DOCUMENTS

| CN | 101454564 A | 6/2009 |
| CN | 101999038 A | 3/2011 |

(Continued)

OTHER PUBLICATIONS

PCT International Search Report and Written Opinion of International Searching Authority mailed Jun. 16, 2020 corresponding to PCT International Application No. PCT/EP2020/058499 filed Mar. 26, 2020.

*Primary Examiner* — Eric J Zamora Alvarez
(74) *Attorney, Agent, or Firm* — Schmeiser, Olsen & Watts LLP

(57) ABSTRACT

Provided is a method of manufacturing at least a portion of rotor blade for a wind turbine, the method including: casting at least a portion of an rotor blade outer surface using a casting material thereby at least partially embedding at least one fluid convey tube into the casting material, the fluid convey tube being provided for conveying fluid into or out of a deformable container for adjusting an adjustable flow regulating device of the rotor blade.

19 Claims, 6 Drawing Sheets

Figure 1:
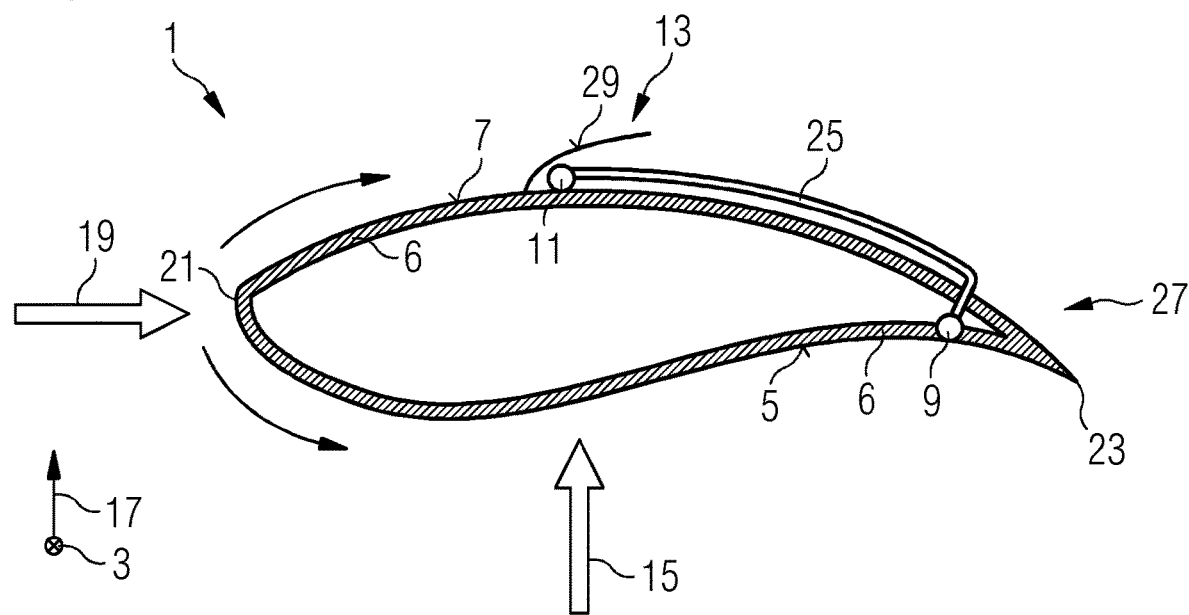

(51) Int. Cl.
*F03D 7/02* (2006.01)
*B29K 105/24* (2006.01)
*B29L 31/08* (2006.01)

(52) U.S. Cl.
CPC ..... *B29L 2031/085* (2013.01); *F05B 2230/21* (2013.01); *F05B 2240/304* (2020.08); *F05B 2240/3052* (2020.08); *F05B 2260/60* (2013.01); *F05B 2280/6003* (2013.01)

(58) Field of Classification Search
CPC ...... F03D 7/0252; F03D 1/065; F03D 7/0236; F03D 3/062; F05B 2240/3052; F05B 2240/31; F05B 2240/3062; F05B 2240/311; F05B 2240/122; F05B 2260/60; F05B 2260/96; F05B 2260/901; F05B 2270/402; F05B 2210/16; F05B 2230/21; F05B 2240/30; F05B 2240/301; F05B 2240/304; F05B 2240/305; F05B 2240/98; F05B 2250/14; F05B 2280/6003; F01D 5/14; B29C 70/742; B29K 2105/24; B29L 2031/085; Y02E 10/72; Y02P 70/50
See application file for complete search history.

(56) References Cited

U.S. PATENT DOCUMENTS

| | | |
|---|---|---|
| 2010/0127504 A1 | 5/2010 | Hancock |
| 2010/0221111 A1 | 9/2010 | Nieuwenhuizen et al. |
| 2010/0247314 A1 | 9/2010 | Narasimalu |
| 2011/0206507 A1 | 8/2011 | Bhaisora et al. |
| 2011/0217167 A1 | 9/2011 | Hancock et al. |
| 2011/0293420 A1 | 12/2011 | Hancock |
| 2012/0009064 A1 | 1/2012 | Baek et al. |
| 2012/0141271 A1* | 6/2012 | Southwick ............ F03D 7/0232 416/1 |
| 2013/0189113 A1 | 7/2013 | Madsen |
| 2014/0272691 A1* | 9/2014 | Calveras ................. G03F 7/027 562/460 |
| 2016/0177922 A1 | 6/2016 | Zamora Rodriguez et al. |
| 2018/0010579 A1* | 1/2018 | Akay ................... F03D 1/0633 |

FOREIGN PATENT DOCUMENTS

| | | |
|---|---|---|
| CN | 102817792 A | 12/2012 |
| DE | 202016000658 U1 | 2/2016 |
| EP | 1623111 B1 | 9/2008 |
| WO | 2018041420 A1 | 3/2018 |
| WO | 2019072948 A1 | 4/2019 |

* cited by examiner

FLUID CONVEY TUBING SYSTEM FOR WIND TURBINE ROTOR BLADE

CROSS-REFERENCE TO RELATED APPLICATIONS

This application claims priority to PCT Application No. PCT/EP2020/058499, having a filing date of Mar. 26, 2020, which is based off of EP Application No. 19171089.6, having a filing date of Apr. 25, 2019, the entire contents both of which are hereby incorporated by reference.

FIELD OF TECHNOLOGY

The following relates to a method of manufacturing at least a portion of a rotor blade for a wind turbine, relates to a rotor blade of a wind turbine and further relates to a wind turbine comprising the rotor blade.

BACKGROUND

A wind turbine rotor blade may have installed an adaptable flow regulating device on its surface, such as a spoiler or a flap. The spoiler may be adjusted in different states. The state of the spoiler may relate to a protrusion height and/or tilt angle by which the spoiler extends from or is angularly tilted relative to other surface portions of the rotor blade. In general, a flow regulating device may be considered to comprise a device which is capable of, in certain conditions, changing or enhancing the lift coefficient of the airfoil section, for example by changing or increasing the level of energy of the boundary layer of the rotor blade.

EP 1 623 111 B1 discloses a wind turbine blade including adjustable lift-regulating means arranged on or at the surface of the wind turbine blade and extending in the longitudinal direction of the blade and an activation means by which the lift-regulating means can be adjusted and thus alter the aerodynamic properties of the blade. The lift-regulating means comprise one or more flexible flaps.

U.S. Pat. No. 8,851,840 B2 discloses a wind turbine blade comprising a blade body and a device for modifying the aerodynamic surface or shape of the blade, wherein a pneumatic actuator controls the position and/or movement of the device, wherein a pressure chamber positioned within the blade body is present. The pressure chamber may be pressurized thereby changing the state of the device, thereby modifying the aerodynamic surface or shape of the blade.

U.S. Pat. No. 5,106,265 A discloses a wind turbine wing comprising a pneumatically actuated spoiler movable perpendicular to an airstream.

WO 2018/041420 disclose a rotor blade comprising an aerodynamic device for influencing the air flow flowing from the leading edge section of the rotor blade to the trailing edge section of the rotor blade, wherein the aerodynamic device is mounted at a surface of the rotor blade and comprises a pneumatic or hydraulic actuator, such as a hose or a cavity of which the volume depends on the pressure of the fluid being present inside the pneumatic or hydraulic actuator.

The adaptable flow regulating device may also be referred to as "trim stall". To activate the flow regulating device (for example bringing it into a position and/or orientation such as to deflect airflow from the airfoil outer surface of the rotor blade), air, electricity or fluid can be used (or any other actively controlled aerodynamic add-on including trailing edge flaps). A conventionally known manner for activating the trim stall is by using air supply or in general fluid supply.

Conventionally, it had been difficult to provide a fluid supply system for a rotor blade having an adjustable flow regulating device installed, such as a spoiler and/or a flap.

An aspect relates to provide a manufacturing method and a corresponding rotor blade of a wind turbine which comprises a fluid convey tubing system supporting to activate and deactivate an adjustable flow regulating device of the rotor blade.

SUMMARY

According an embodiment of the present invention it is provided a method of manufacturing at least a portion of rotor blade for a wind turbine, the method comprising: casting at least a portion of an rotor blade outer surface using a casting material thereby at least partially embedding at least one fluid convey tube into the casting material, the fluid convey tube being provided for conveying fluid into or out of a deformable container for adjusting an adjustable flow regulating device of the rotor blade.

The manufactured portion of the rotor blade may for example be or comprise a half of the rotor blade or a half of the total outer surface of the rotor blade. In other embodiments, the portion may for example correspond to between 10% and 30% or between 10% and 50% or between 10% and 100% of the rotor blade. The rotor blade outer surface comprises an airfoil portion to be exposed to an airflow during operation of the wind turbine having the rotor blade for effectively converting wind energy to rotational energy which in turn is converted to electric energy.

The casting material may comprise thermosetting material which is conventionally used, including resin and/or fibre material. Casting may require a mold having a geometry corresponding to a desired shape of the rotor blade outer surface. The mold may for example have been covered with fibre material, such as a web or a cloth or a texture of fibre material before casting the casting material upon it.

The fluid convey tube may comprise a plastic tube having a diameter of between 0.5 inch and 2 inches for example. The fluid convey tube may be configured for conveying fluid, in particular air, within a lumen, i.e. an inside of the tube. The fluid may be pressurized and the fluid convey tube may be configured for withstanding a pressure between 1 bar and 50 bar. According to an embodiment of the present invention, the fluid is not directly guided or conveyed in an inside (or lumen) of the fluid convey tube, but in an inside (or lumen) of an additional inner tube, made for example of rubber, which inner tube may have been inserted into the fluid convey tube.

At least partially embedding at least one fluid convey tube into the casting material may be understood to bringing the fluid convey tube at least in a portion of an outer surface of the fluid convey tube between 30 and 70% or 30 and 100% in contact with the casting material. According to embodiments of the present invention, the casting material used for casting the rotor blade outer surface may completely surround or entirely cover or embed the fluid convey tube.

The deformable container may be configured as a hose or a bag which may be installed at the completed rotor blade and may be arranged such as to allow adjusting the adjustable flow regulating device, by inflating or deflating the deformable container.

In particular, embodiments of the present invention support the selective adjustment of each segment of a segmented adjustable flow regulating device, wherein segments of the segmented adjustable flow regulating device may be installed along the longitudinal direction of the rotor blade.

In these embodiments, plural fluid convey tubes may be provided and embedded into the casting material each one being associated with a particular segment of the segmented adjustable flow regulating device.

Other embodiments may comprise only a single fluid convey tube for adjusting for example a single adjustable flow regulating device, for example extending substantially across a portion or an entire of the longitudinal extent of the rotor blade. Thus, one or more fluid convey tubes may be embedded into the blade structure and may stay there during casting of the rotor blade.

The adjustable flow regulating device may comprise a spoiler having a flow regulating device airfoil surface which position and/or orientation is changeable depending on the inflation state of the deformable container.

Thereby, a fluid convey system is provided which can in a reliable manner support a rotor blade having an adjustable flow regulating device installed.

According to an embodiment of the present invention, the portion of the rotor blade outer surface and a fluid convey tube embedding material are chemically crosslinked with each other in the completed rotor blade. After casting the casting material, the casting material which is originally fluid may be solidified, involving forming chemical cross-links between different molecules of the casting material. Chemical cross-links may thereby connect the solidified casting material of the rotor outer surface with the solidified casting material around or embedding the fluid convey tube. In particular, a single casting process followed by a single solidification step may be performed for co-casting the rotor blade outer surface and embedding the fluid convey tube, thereby forming a continuous solidified casting material extending from the rotor blade outer surface towards and around the fluid convey tube. Thereby, a reliable and permanent connection and mounting of the fluid convey tube towards the completed rotor blade may be achieved.

According to an embodiment of the present invention, the fluid convey tube is arranged to extend in a longitudinal direction of the completed rotor blade, in particular in a straight manner, and is arranged such as to be situated completely inside the completed rotor blade. The fluid convey tube is provided for conveying fluid from and to a root of the rotor blade (or a hub at which the rotor blade is connected) to and from one or more respective adjustable flow regulating devices installed at different longitudinal positions of the rotor blade. The longitudinal direction of the completed rotor blade corresponds to a direction along which the rotor blade has a largest extent. The longitudinal direction of the rotor blade may for example correspond to a blade pitch rotation axis or may at least be parallel to this axis.

In cross-section, the fluid convey tube may for example have a rectangular, quadratic or oval or circular shape. A longitudinal direction of the fluid convey tube may correspond to the direction along which the fluid convey tube has a largest extent and may correspond to a flow direction of the fluid being conveyed within the fluid convey tube. The longitudinal direction of the fluid convey tube may be parallel (or nearly parallel, having a deviation less than 20° or less than 10°) to the longitudinal direction of the completed rotor blade. When the fluid convey tube is situated completely inside the completed rotor blade, the fluid convey tube may not interfere or disturb an airflow during normal operation of the wind turbine.

According to an embodiment of the present invention, the fluid convey tube is arranged such as to be situated in a trailing edge region of the completed rotor blade and/or the fluid convey tube is arranged in a sandwich panel within the completed rotor blade.

The rotor blade may comprise a leading edge and a trailing edge which edges are definable and related to the intended usage of the rotor blade. The leading edge may be the front edge of the rotating rotor blade. The air will, during rotation of the rotor blade, first hit the leading edge of the rotor blade, then will flow at the suction surface and the pressure surface of the rotor blade and will leave the rotor blade at the trailing edge. Since the air first impacts on the leading edge, the trailing edge region may be subjected to less stress due to air impact. Thus, arranging the fluid convey tube in a trailing edge region may not bear the risk that the integrity of the fluid convey tube or the entire rotor blade is deteriorated. The trailing edge region may for example comprise a region beginning at the trailing edge and extending towards the leading edge by an extent of between 10% and 30% of the entire (lateral) extent of the rotor blade from the leading edge to the trailing edge. If plural fluid convey tubes are provided, those may be arranged parallel to each other, side by side, for example in one layer.

A sandwich panel may be a reinforcing element inside the rotor blade being formed by at least two structural layers or panels for example arranged parallel to each other leaving a space in between. Within this space, the one or more fluid convey tubes may be arranged.

According to an embodiment of the present invention, the fluid convey tube is arranged such as to be closer to a pressure side than to a suction side of the completed rotor blade. At the pressure side, less stress may be present than at the suction side. Correspondingly, the stress being applied or being present at the suction side may not be as severe as to deteriorate the mounting of the fluid convey tube or the entire rotor blade portion.

According to an embodiment of the present invention, the fluid convey tube is closed at one or both ends during the casting of the casting material, in particular using a plug. When the fluid convey tube is closed at one or both ends during the casting, it may be avoided that casting material penetrates into an inside (or lumen) of the fluid convey tube. Thereby, clogging or contamination of the fluid convey tube may be avoided. After casting, the fluid convey tubes may be opened again, for example by removing the one or more plugs.

According to an embodiment of the present invention, the method further comprises before the casting: wrapping fibre material, in particular comprising glass-fibre material and/or carbon fibre material, around the fluid convey tube; and/or wherein the casting material comprises resin and/or fibre material. When fibre material is wrapped around the fluid convey tube before the casting, the casting material may then wet the wrapping fibre material and soak the wrapping material. After solidification, a good connection with other rotor blade portions, in particular the rotor blade outer surface, may be achieved. Further, the fluid convey tube may be protected by the solidified casting material between the wrapping fibre material. Thereby, a reinforced integration of the fluid convey tube into an inside of the rotor blade is provided.

According to an embodiment of the present invention, the method further comprises after the casting at least one of: forming a blade opening, in particular in a trailing edge region, at the blade outer surface, in particular at a suction side, towards an end of the fluid convey tube; leading a portion of a linking tube through the opening; connecting the linking tube with the end of the fluid convey tube; guiding the linking tube to run, in particular perpendicular to the longitudinal direction, at least partially along the blade outer surface to a respective deformable container; (e.g. reversibly) closing the blade opening with a lid while allowing the linking tube to run through the lid.

These steps may be performed after solidification and or cross-linking of the casting material. The blade opening may for example be formed by sawing. The blade opening may for example have a rectangular or quadratic shape. The position of the blade opening may correspond to a position of the end of the fluid convey tube. The blade opening may extend from an outside of the blade up to the end of the fluid convey tube in the inside of the blade. A plug closing the end of the fluid convey tube may for example be removed after forming the blade opening.

The linking tube may comprise one or more elements, such as bend member(s) and further one or more straight linking tube portions. The linking tube is provided for allowing connection of the embedded fluid convey tube with a deformable container at the outside surface of the blade. The linking tube may be guided to run at least partially along the blade outer surface, since space inside the rotor blade may be not sufficient. In other embodiments, the linking tube may be guided within the rotor blade, at least partially or even entirely. Thereby, interference with airflow may be avoided or at least reduced.

The blade opening may, using the lid, be reversibly closable and may also be reversibly opened. Thereby, maintenance of the fluid convey tube may be facilitated. In particular, using the blade opening, access to the end of the fluid supply tube may be provided. Thereby, for example, inner tubes, such as rubber tubes, may be exchanged or inserted. The lid may comprise a respective opening through which the linking tube may be guided. Thereby, a simple manner is provided for connecting the fluid convey tube with the respective deformable container.

According to an embodiment of the present invention, the method further comprises after the casting: placing a flexible hose, in particular rubber hose, into an inside of the fluid convey tube and/or the linking tube. In this embodiment, the fluid convey tube serves only as a supporting or protecting member for supporting the flexible hose through which finally the fluid is guided. Thereby, the advantage may be achieved that the flexible hose may not have been brought in contact with the fluid casting material, thereby avoiding contamination of the flexible hose which contamination may conversely be present at and in particular within the fluid convey tube. Furthermore, a diameter of the flexible hose may be selected depending on the particular application.

According to an embodiment of the present invention, the linking tube comprises at least one bend member providing two 90° bends in two different planes and comprises one straight linking portion. The bend members may be plastic pieces which may be jacked onto respective ends of the fluid convey tube or the linking tube for connection.

According to an embodiment of the present invention, the at least one fluid convey tube comprises plural, in particular 2 to 10, fluid convey tubes having different lengths and arranged parallel to each other side by side, wherein the different lengths are selected such as to correspond to a distance between a respective longitudinal position of a segment of the flow regulating device and a rotor blade root.

When plural fluid convey tubes are arranged within the rotor blade, in particular plural adjustable flow regulating devices or a segmented flow regulating device may be supported. For example, plural segments of a flow regulating device may be arranged at plural different longitudinal positions of the rotor blade. Each of the plural fluid convey tubes may reach to a respective segment of the flow regulating device, in particular an associated fluid container. Thus, each of the segments of the flow regulating device may individually be adjusted to be for example in different states regarding position and/or orientation of an airfoil surface of the respective segment of the flow regulating device.

According to an embodiment of the present invention, the method further comprises: arranging fibre material on a mold; arranging the at least one fluid convey tube onto the fibre material; casting the casting material onto the fluid convey tube and the fibre material, thereby in particular applying vacuum assisted resin transfer molding, wherein the mold is in particular suitable to cast a half of a rotor blade.

The fibre material soaked with the casting material may provide, upon solidification, a stable and resistive structure configured to withstand the stress generated by the impacting air. Thereby, a fibre enforced composite material may be formed.

The vacuum-assisted resin transfer molding (VARTM) is a variation of resin transfer molding (RTM) with its distinguishing characteristic being the replacement of the top portion of a mold tool with a vacuum bag and the use of a vacuum to assist in resin flow or in general casting material flow. Typically, this process may use a low viscosity 100 to 1000 cP polyester or vinyl ester resin along with fibre material, such as glass-fibres, to create a composite. The fibre volume fraction may be between 40 and 50%. Both VARTM and RTM are closed mold processes where pressure is used to inject resin into the mold.

It should be understood, that features, individually or in any combination, disclosed, described, explained or applied for a method of manufacturing at least a portion of a rotor blade for a wind turbine, may also apply, according to embodiments of the present invention, to a rotor blade and vice versa.

According to an embodiment of the present invention it is provided a rotor blade of a wind turbine, comprising: a cast rotor blade outer surface formed by crosslinked casting material; and at least one fluid convey tube embedded into the crosslinked casting material, the fluid convey tube being provided for conveying fluid into or out of a deformable container for adjusting an adjustable flow regulating device of the rotor blade.

The rotor blade may, according to an embodiment of the present invention, further comprise a flow regulating device, in particular spoiler, installed at a portion of the rotor blade outer surface and comprising a deformable fluid container connected with the fluid convey tube and comprising a flow regulating device airfoil surface (to be exposed to an air flow during operation) whose orientation and/or position is changeable depending on an inflation state of the container.

The flow regulating device may in particular be configured as a segmented flow regulating device, i.e. a flow regulating device having plural segments being arranged along the longitudinal direction of the rotor blade. To each segment of the flow regulating device, a deformable container and a respective fluid convey tube may be associated with or connected to allowing to individually control the state of each segment of the flow regulating device. The rotor blade may also comprise plural different flow regulating devices each of which may be controlled or activated using a respective associated fluid convey tube installed within the rotor blade.

According to an embodiment of the present invention it is provided a wind turbine, comprising: at least one rotor blade according to the preceding embodiment; a rotor shaft at which the rotor blade is mounted; a fluid pressurizing system, inside the blade or inside a hub, connected to the fluid convey tube.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Figure 2:
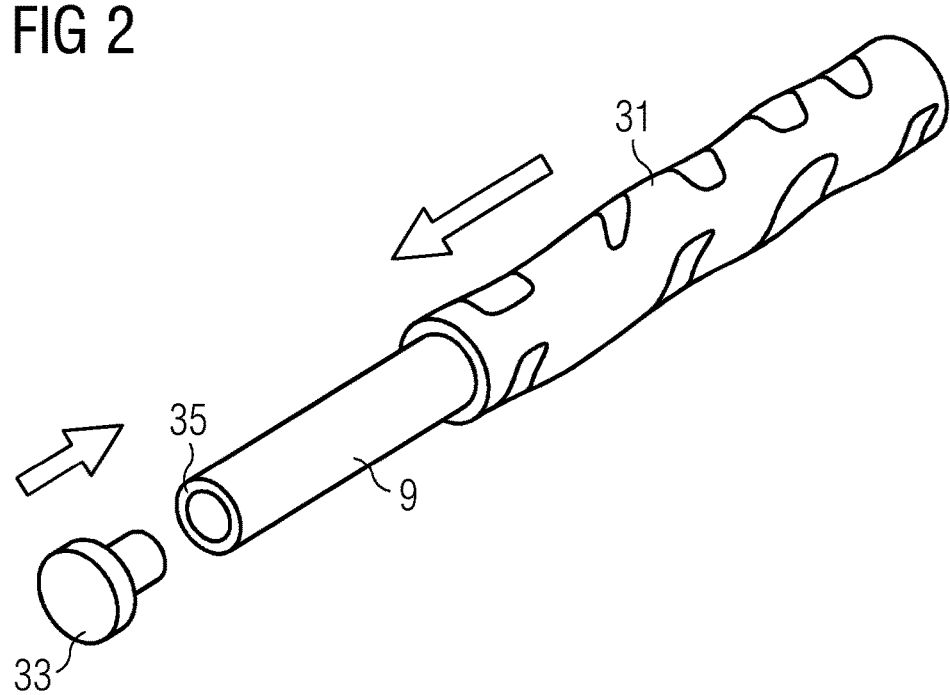
Figure 3:
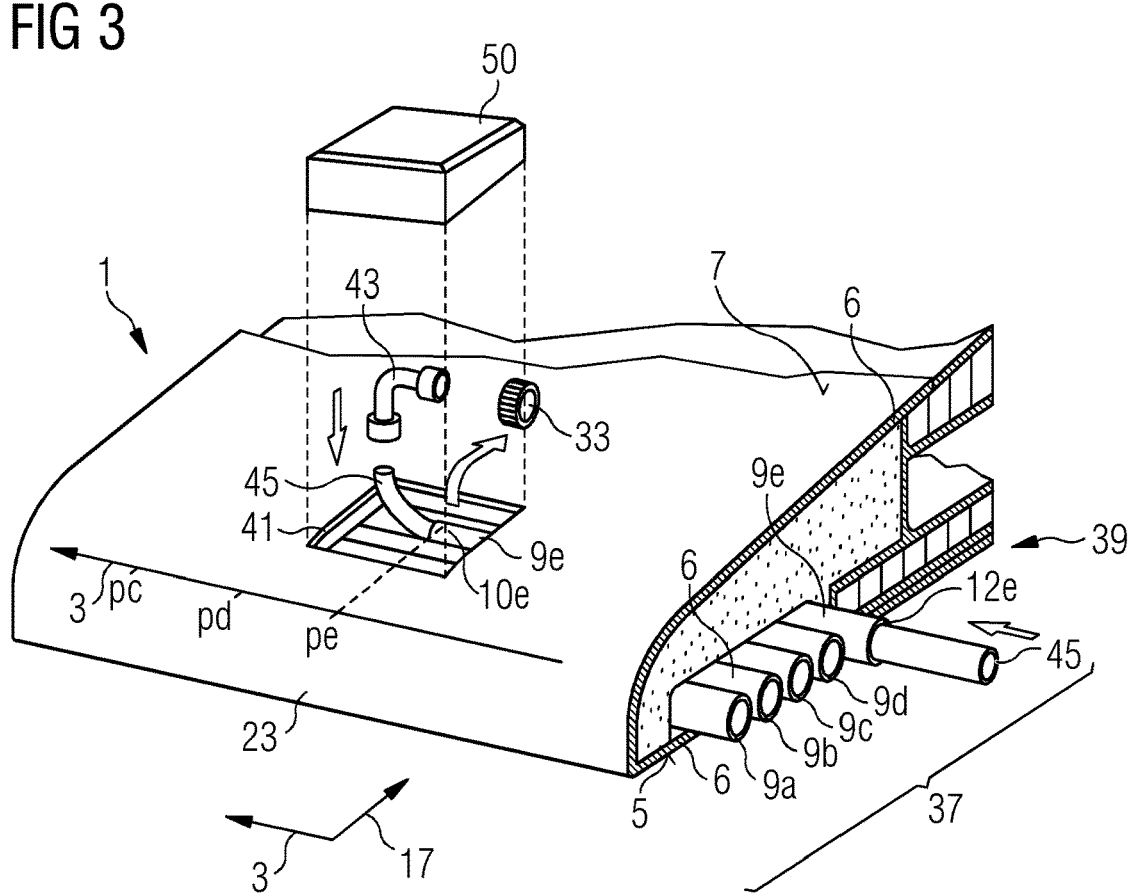
Figure 4:
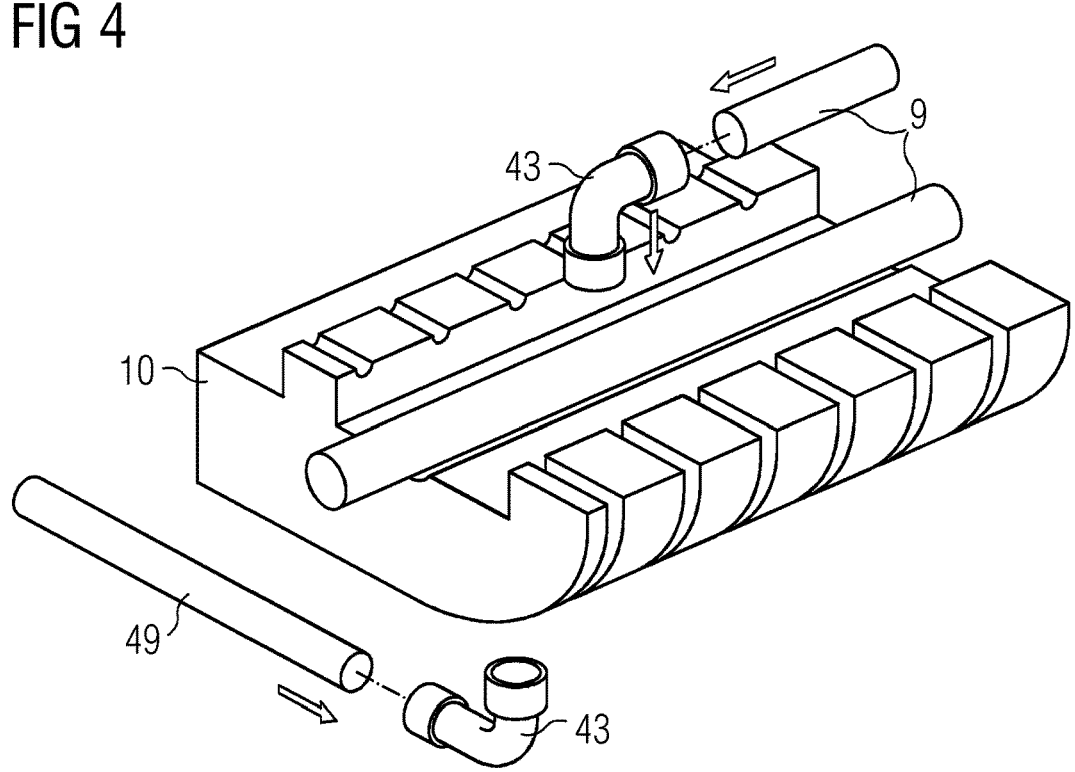
Figure 5:
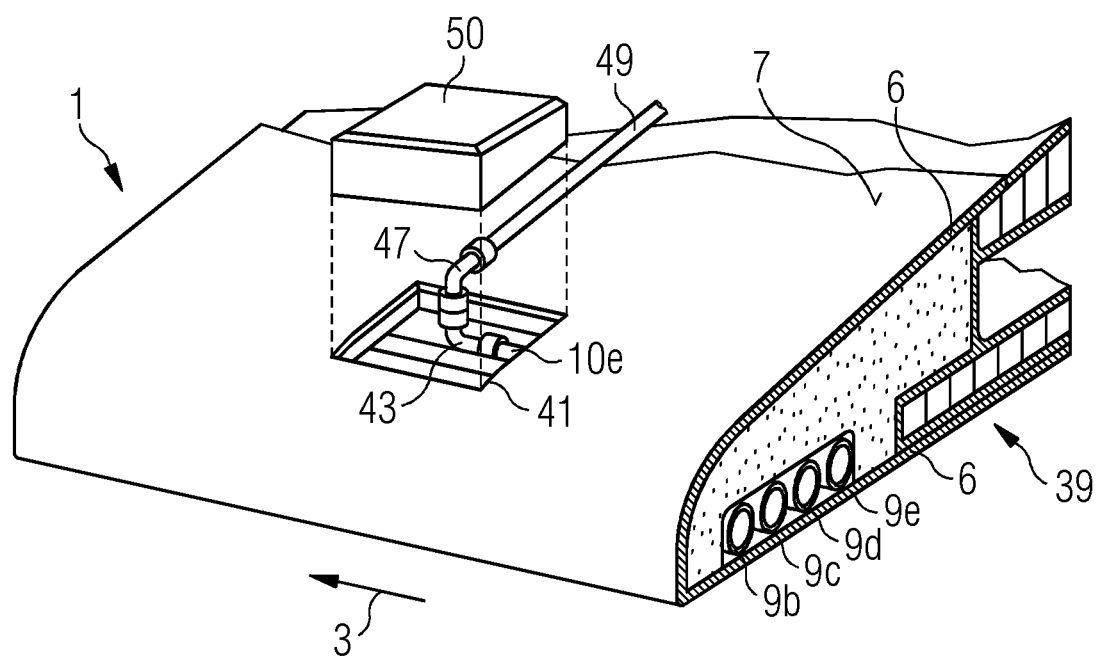
Figure 6:
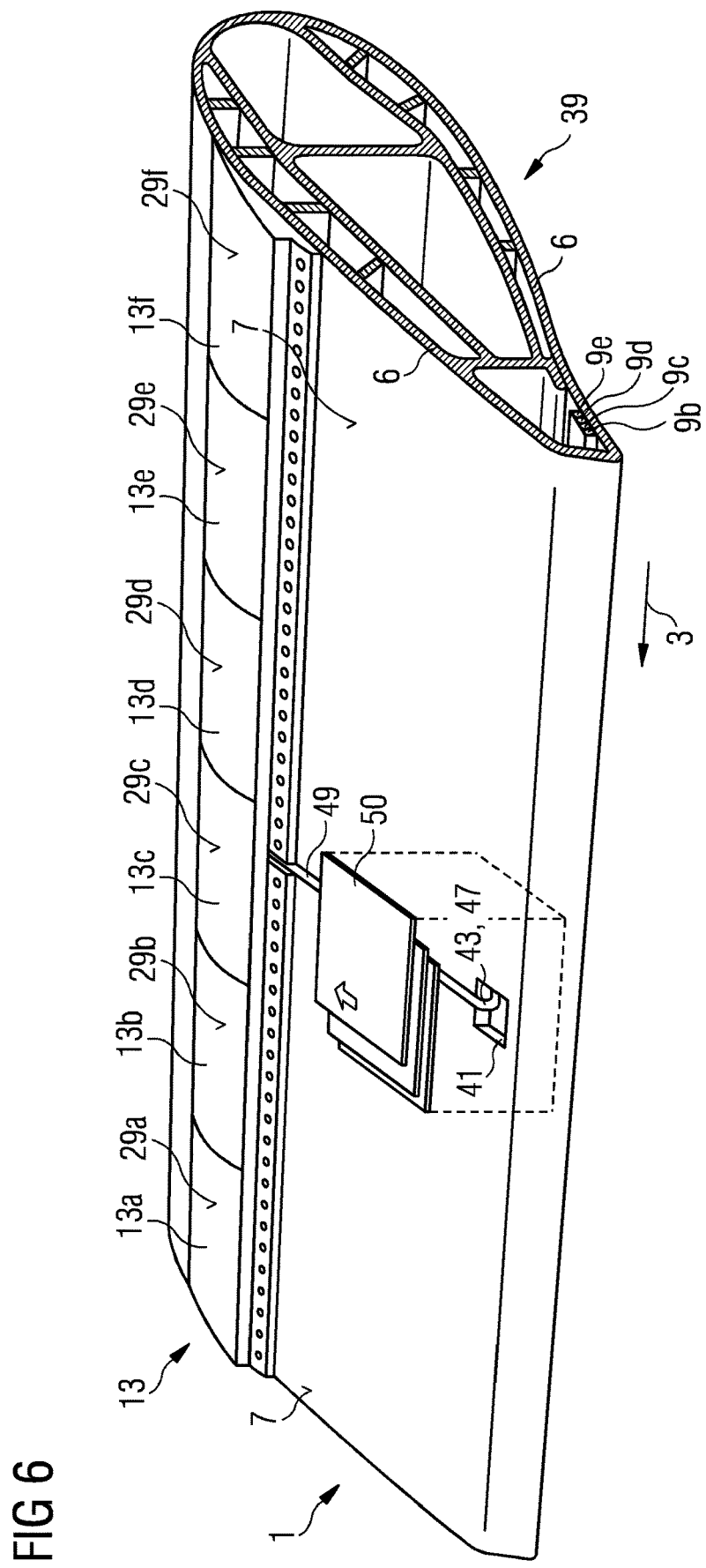
Figure 7:
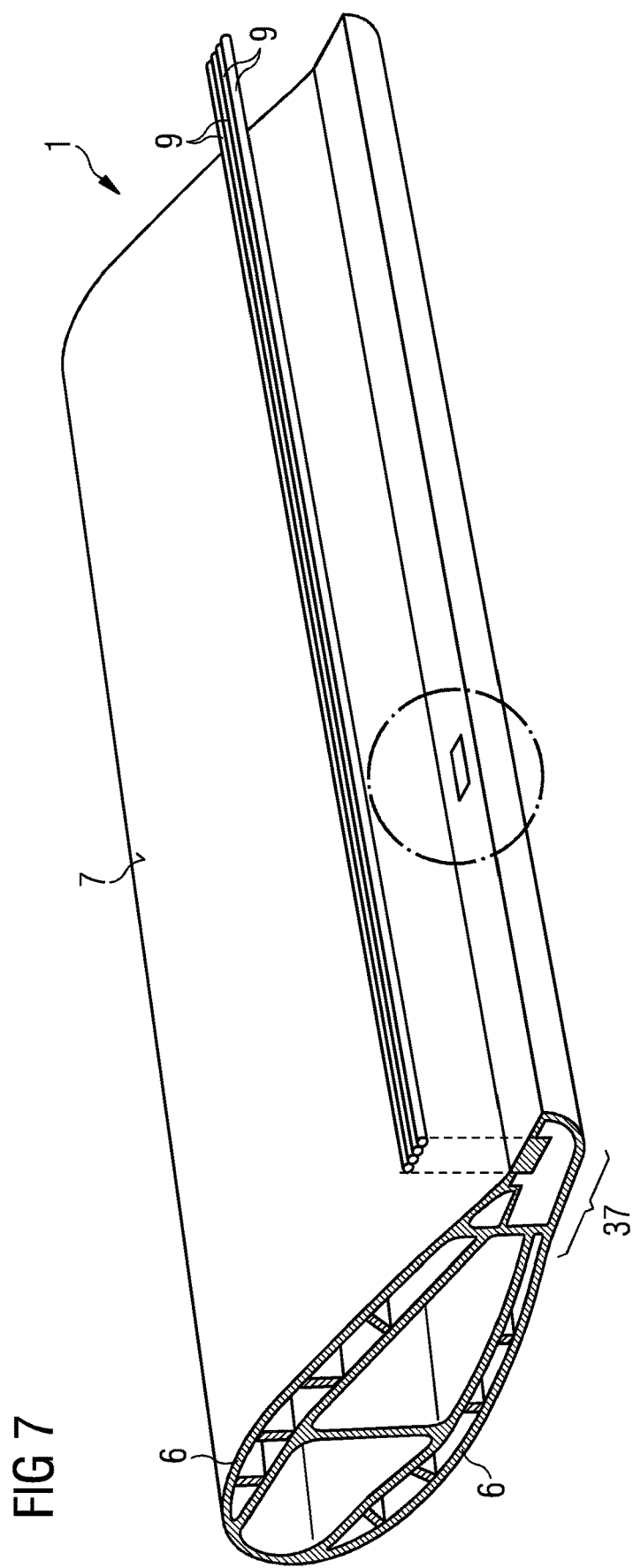
Figure 8:
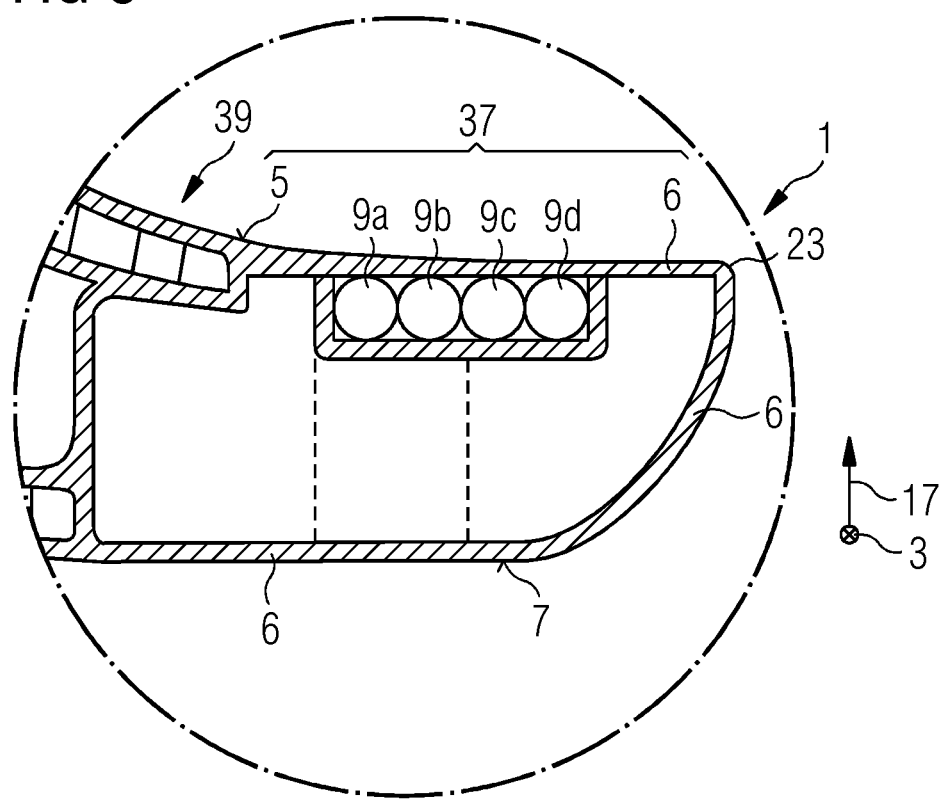

Some of the embodiments will be described in detail, with reference to the following figures, wherein like designations denote like members, wherein:

FIG. 1 schematically illustrates a rotor blade according to an embodiment of the present invention;

FIG. 2 schematically illustrates a manufacturing step of wrapping and plugging a fluid convey tube according to an embodiment of the present invention;

FIG. 3 schematically illustrates a manufacturing step of providing a blade opening according to an embodiment of the present invention;

FIG. 4 schematically illustrates tube connecting steps during a manufacturing method according to an embodiment of the present invention;

FIG. 5 schematically illustrates a manufacturing step according to an embodiment of the present invention;

FIG. 6 schematically illustrates a stage during manufacturing a rotor blade according to an embodiment of the present invention;

FIG. 7 schematically illustrates a location of fluid convey tubes according to an embodiment of the present invention; and FIG. 8 illustrates a sectional view of a portion of a rotor blade according to an embodiment of the present invention.

DETAILED DESCRIPTION

The illustration in the drawings is in schematic form.

The rotor blade 1 schematically illustrated in FIG. 1 in a sectional view along a longitudinal direction 3 of the rotor blade according to an embodiment of the present invention comprises a pressure side rotor blade outer surface 5 formed by cross-linked casting material 6. Further, the rotor blade comprises a suction side rotor blade outer surface 7 also formed by cross-linked casting material 6.

Further, the rotor blade 1 comprises at least one fluid convey tube 9 (which runs along the longitudinal direction 3 of the rotor blade) which is embedded into the cross-linked casting material 6, wherein the fluid convey tube 9 is being provided for conveying fluid (such as air) into and out of a deformable container 11 for adjusting an adjustable flow regulating device 13 (in particular a spoiler) of the rotor blade 1.

During operation in the presence of wind 15, the rotor blade 1 rotates around a rotational axis parallel to the direction 17 (e.g. a horizontal direction) such that apparent wind 19 is experienced by the rotating rotor blade 1. The rotor blade comprises a leading edge 21 at which the apparent wind impacts and comprises further a trailing edge 23 at which the flowing air leaves the rotor blade 1.

As can be seen from FIG. 1, the flow regulating device 13 is installed at a portion of the rotor blade outer surface, in particular at the suction side 7 of the rotor blade outer surface and comprises the deformable fluid container 11 which is connected with the fluid convey tube 9 via a linking tube 25 comprising also a bend member 27. The flow regulating device comprises a flow regulating device airfoil surface 29 whose orientation and/or position is changeable depending on an inflation state of the container 11.

The rotor blade illustrated in FIG. 1 is manufactured by a manufacturing method according to an embodiment of the present invention. In a first manufacturing step illustrated in FIG. 2, a fluid convey tube 9 is wrapped with fibre material 31 such that the fibre material 31 surrounds the fluid convey tube 9. Further, a plug 33 is inserted into an end opening 35 of the fluid convey tube 9, in order to close the inner lumen of the fluid convey tube 9, thereby preventing contamination with casting material later applied.

A portion of a rotor blade outer surface, in particular a pressure side rotor blade outer surface 5, is then cast using a casting material 6, thereby at least partially embedding at least one fluid convey tube 9a, 9b, 9c, 9d, 9e into the casting material 6. This casting is not explicitly shown in the figures. The result of the casting can be taken for example from FIG. 3 showing the rotor blade outer surface at the pressure side 5 which has been cast together with the fluid convey tubes 9a, . . . , 9e, thereby, the casting material 6 embeds the fluid convey tubes 9a, 9b, 9e and is also present in between the fluid convey tubes.

Further, as can be taken from FIG. 3, the fluid convey tubes 9a, . . . , 9e are arranged to extend in the longitudinal direction 3 of the completed rotor blade and are arranged such as to be situated completely inside the completed rotor blade 1 from which FIG. 3 only illustrates a portion.

As can be also taken from FIG. 3 or from FIGS. 5, 6, 7 and 8, the fluid convey tubes 9a, 9b, 9c, 9d, 9e are arranged such as to be situated in a trailing edge region 37 adjacent to or close to the trailing edge 23 of the rotor blade 1. In other embodiments, the fluid convey tubes or at least one of the fluid convey tubes may be arranged within a sandwich panel 39 within the rotor blade 1. As also can be taken from FIGS. 3, 5, 6, 8, the fluid convey tubes 9a, . . . , 9e are arranged such as to be closer to a pressure side, i.e. the pressure side rotor blade outer surface 5 than to the rotor blade outer surface suction side 7.

As is further illustrated in FIG. 3, illustrating a stage after casting the casting material 6 and after solidification i.e. cross-linking the casting material 6, a blade opening 41 also situated within the trailing edge region 37 is formed, for example by sawing or cutting out a portion which may later be used as a lid 50. The blade opening 41 has for example a rectangular shape. As can be seen from FIG. 3, the opening 41 is provided at the suction side blade outer surface 7.

In the embodiment as illustrated in FIG. 3, the rotor blade 1 is equipped with plural fluid convey tubes 9a, . . . , 9e having different lengths. The opening 41 is formed at a longitudinal position pe at which the fluid convey tube 9e has its end 10e. The fluid convey tubes 9d, 9c, 9b end at the other longitudinal positions pd, pc and pb, respectively. Also, at these other positions respective other openings may be formed for allowing connection of the respective fluid convey tube 9d, 9c, 9b to a respective linking tube as will be explained with reference to FIGS. 5 and 6.

After having provided the opening 41, the plug 33 is removed from the end 10e of the fluid convey tube 9e. Further, a bend member 43 providing a 90° bend may be connected to the end 10e of the fluid convey tube 9e.

Furthermore, a flexible hose, in particular rubber hose 45, is inserted into the fluid convey tube 9e extending beyond the end 10e and also extending beyond another end 12e of the fluid convey tube 9e which end 12e may be close to or at the blade root portion.

As illustrated in FIG. 4, the tube 9 is supported by a support member 10, e.g. before the casting.

As is illustrated in FIG. 5, the first bend member 43 and a second bend member 47 are connected to the end 10e of the fluid convey tube 9e. Thereby, two 90° bends are provided which are in orthogonal planes. To the second bend member 47 a straight linking portion 49 is connected which leads to an inflatable or deformable container of a flow regulating device.

In FIG. 6, a larger portion of the rotor blade also illustrating the flow regulating device 13 is shown including the straight tube linking portion 49. The flow regulating device 13 may be single-segmented or may comprise several segments 13a, 13b, 13c, ..., 13f which each have an inflatable container which is individually connected to an associated fluid convey tube, one of the fluid convey tubes 9a, ..., 9e.

FIG. 7 again illustrates the location of the fluid convey tubes 9a, ..., 9e in a trailing edge region 37 of the rotor blade 1.

FIG. 8 illustrates in a cross-sectional view a portion of a rotor blade 1 seen along the longitudinal axis 3 of the rotor blade. Plural fluid convey tubes 9a, 9b, 9c, 9d are arranged extending in the longitudinal direction 3 and being arranged at a trailing edge region 37 close to the rotor outer blade suction side 5.

The fluid convey tube(s) may be closed with plugs 33 for avoiding resin (or in general casting material 6) to penetrate into the fluid convey tubes 9 during the casting process. After casting, the fluid convey tube can be connected between an air supply of the blade root to the trim stall (in particular the inflatable container 11 of a flow regulating device which is placed along the external blade surface, in particular the suction side rotor blade outer surface 7). The fluid convey tubes are proposed to be placed in the trailing edge region 37 of the blade where space may be available. The fluid convey tubes may additionally or alternatively be placed in sandwich panels (for example illustrated in FIG. 3, 5, 6 where sandwich panels 39 are illustrated). The fluid convey tubes may be wrapped with glass-fibres (an example of a wrapping material 31 as illustrated in FIG. 2) to ensure a good connection to the blade structure to minimize the risk of wear and cracks between the tubes and the blade structure.

Rubber hoses 45 for the air supply may be placed inside the embedded fluid convey tubes 9 in order to have the possibility to exchange tubes for air supply during the lifetime of the blade. When the fluid convey tubes are embedded/casted into the blade structure, post mounting of the air supply tubes on the inside of the blade can be avoided, since this may problematic due to limited space. The air supply system to trim stall may be applied into the blade structure before casting the blade. Thereby, also the mounting of the tubing system may be simplified, as no additional adhesive or mounting members are required.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of manufacturing at least a portion of a rotor blade for a wind turbine, the method comprising:
   casting at least a portion of a rotor blade outer surface using a casting material thereby at least partially embedding at least one fluid convey tube into the casting material, the at least one fluid convey tube being provided for conveying fluid into or out of a deformable container for adjusting an adjustable flow regulating device of the rotor blade; and
   after the casting, forming an opening in the rotor blade outer surface, the opening located a distance along the rotor blade outer surface from the deformable container, and connecting the at least one fluid convey tube to the deformable container located externally along the rotor blade outer surface with a linking tube that extends along the rotor blade outer surface from the opening to the deformable container;
   wherein a section of the at least one fluid convey tube is situated completely inside the rotor blade and the section is embedded under the rotor blade outer surface;
   wherein the portion of the rotor blade outer surface and a fluid convey tube embedding material are chemically crosslinked with each other in the rotor blade.

2. The method according to claim 1, wherein the at least one fluid convey tube is arranged to extend in a longitudinal direction of the rotor blade in a straight manner.

3. The method according to claim 1,
   wherein the at least one fluid convey tube is arranged such as to be situated in a trailing edge region of the rotor blade and/or
   wherein the at least one fluid convey tube is arranged in a sandwich panel within the rotor blade.

4. The method according to claim 1, wherein the at least one fluid convey tube is arranged such as to be closer to a pressure side than to a suction side of the rotor blade.

5. The method according to claim 1, wherein the at least one fluid convey tube is closed with a plug at one or both ends during the casting of the casting material.

6. The method according to claim 1, further comprising: before the casting, wrapping fibre material around the at least one fluid convey tube; and/or wherein the casting material comprises resin and/or fibre material.

7. The method according to claim 1, further comprising, after the casting:
   forming the opening in a trailing edge region, at the rotor blade outer surface at a suction side, towards an end of the at least one fluid convey tube;
   leading a portion of the linking tube through the opening;
   connecting the linking tube with the end of the at least one fluid convey tube;
   guiding the linking tube to run perpendicular to a longitudinal direction, at least partially along the rotor blade outer surface to the deformable container; and
   closing the opening with a lid while allowing the linking tube to run through the lid.

8. The method according to claim 7, wherein the linking tube comprises at least one bend member providing two 90° bends in two different planes and comprises one straight tube linking portion.

9. The method according to claim 1, further comprising, after the casting:
placing a flexible hose into an inside of the at least one fluid convey tube and/or an inside of the linking tube.

10. The method according to claim 1, wherein the at least one fluid convey tube comprises a plurality of fluid convey tubes having different lengths and arranged parallel to each other side by side, further wherein the different lengths are selected such as to correspond to a distance between a respective longitudinal position of a segment of the flow regulating device and a rotor blade root.

11. The method according to claim 1, further comprising:
arranging fibre material on a mold;
arranging the at least one fluid convey tube onto the fibre material;
casting the casting material onto the at least one fluid convey tube and the fibre material; applying vacuum assisted resin transfer molding, wherein the mold is suitable to cast a half of the rotor blade.

12. The method according to claim 1, wherein the section is embedded into the casting material under the rotor blade outer surface.

13. The method according to claim 1, wherein the at least one fluid convey tube extends externally to the rotor blade through the opening of the rotor blade.

14. The method according to claim 1, wherein another section of the at least one fluid convey tube, which is different from the section embedded under the rotor blade outer surface, is located outside of the rotor blade, above the rotor blade outer surface.

15. A rotor blade of a wind turbine, comprising:
a cast rotor blade outer surface formed by crosslinked casting material; and
at least one fluid convey tube embedded into the crosslinked casting material;
wherein the at least one fluid convey tube is provided for conveying fluid into or out of a deformable container for adjusting an adjustable flow regulating device of the rotor blade;
wherein the cast rotor blade outer surface includes an opening located a distance along the cast rotor blade outer surface from the deformable container, the at least one fluid convey tube being connected to the deformable container located externally along the cast rotor blade outer surface by a linking tube that extends along the cast rotor blade outer surface from the opening to the deformable container;
wherein a section of the at least one fluid convey tube is situated completely inside the rotor blade and the section is embedded under the rotor blade outer surface; and
wherein the portion of the rotor blade outer surface and a fluid convey tube embedding material are chemically crosslinked with each other in the rotor blade.

16. The rotor blade according to claim 15, further comprising:
a flow regulating device installed at a portion of the cast rotor blade outer surface and comprising the deformable fluid container connected with the at least one fluid convey tube and comprising a flow regulating device airfoil surface whose orientation and/or position is changeable depending on an inflation state of the deformable container.

17. A wind turbine, comprising:
the at least one rotor blade according to claim 16;
a rotor shaft at which the at least one rotor blade is mounted; and
a fluid pressurizing system, inside the at least one rotor blade or inside a hub, connected to the at least one fluid convey tube.

18. A method of manufacturing at least a portion of a rotor blade for a wind turbine, the method comprising:
casting at least a portion of a rotor blade outer surface using a casting material thereby at least partially embedding at least one fluid convey tube into the casting material, the at least one fluid convey tube being provided for conveying fluid into or out of a deformable container for adjusting an adjustable flow regulating device of the rotor blade;
wherein the at least one fluid convey tube is closed with a plug at one or both ends during the casting of the casting material.

19. A method of manufacturing at least a portion of a rotor blade for a wind turbine, the method comprising:
casting at least a portion of a rotor blade outer surface using a casting material thereby at least partially embedding at least one fluid convey tube into the casting material, the at least one fluid convey tube being provided for conveying fluid into or out of a deformable container for adjusting an adjustable flow regulating device of the rotor blade;
wherein the at least one fluid convey tube comprises a plurality of fluid convey tubes having different lengths and arranged parallel to each other side by side, further wherein the different lengths are selected such as to correspond to a distance between a respective longitudinal position of a segment of the flow regulating device and a rotor blade root.

* * * * *